US009599247B2

United States Patent
Flühs et al.

(10) Patent No.: US 9,599,247 B2
(45) Date of Patent: Mar. 21, 2017

(54) ELECTROMAGNETIC VALVE FOR CONTROLLING THE FLOW OF A PRESSURE MEDIUM

(71) Applicant: KENDRION (VILLINGEN) GmbH, Villingen-Schwenningen (DE)

(72) Inventors: Joachim Flühs, Villingen-Schwenningen (DE); Holger Brandenburg, Villingen-Schwenningen (DE)

(73) Assignee: KENDRION (VILLINGEN) GMBH, Villingen-Schwenningen (DE)

( * ) Notice: Subject to any disclaimer, the term of this patent is extended or adjusted under 35 U.S.C. 154(b) by 0 days.

(21) Appl. No.: 14/773,871

(22) PCT Filed: Jun. 3, 2014

(86) PCT No.: PCT/EP2014/061481
§ 371 (c)(1),
(2) Date: Sep. 9, 2015

(87) PCT Pub. No.: WO2014/198587
PCT Pub. Date: Dec. 18, 2014

(65) Prior Publication Data
US 2016/0109034 A1 Apr. 21, 2016

(30) Foreign Application Priority Data
Jun. 13, 2013 (DE) .................. 10 2013 211 014

(51) Int. Cl.
*F16K 31/06* (2006.01)
*F16F 9/46* (2006.01)
*F16K 1/54* (2006.01)

(52) U.S. Cl.
CPC .......... *F16K 31/0675* (2013.01); *F16F 9/464* (2013.01); *F16K 1/54* (2013.01); *F16K 31/0648* (2013.01)

(58) Field of Classification Search
CPC .... F16K 31/0675; F16K 1/54; F16K 31/0648; F16F 9/464
(Continued)

(56) References Cited

U.S. PATENT DOCUMENTS 3,100,103 A * 8/1963 Bullard ................. F16K 31/408
251/30.03
4,504,039 A * 3/1985 Akagi .................... F02M 69/32
251/129.21
(Continued)

FOREIGN PATENT DOCUMENTS

DE 44 23 103 A1 7/1994
DE 199 52 800 A1 11/1999
(Continued)

OTHER PUBLICATIONS

GTPO office action dated Feb. 7, 2014 issued in corresponding patent application No. DE 10 2013 211 014.6.
(Continued)

*Primary Examiner* — John Bastianelli
(74) *Attorney, Agent, or Firm* — Juneau & Mitchell

(57) ABSTRACT

An electromagnetic valve for controlling the flow of a pressure medium, said electromagnetic valve comprising a valve housing with an inlet port and an outlet port for the pressure medium; at least one passage opening, which connects the inlet port to the outlet port, for the pressure medium; a valve slide that can be moved axially between a first basic position, which closes the passage opening, and a second basic position, which opens the passage opening, by means of a solenoid coil; and a spring assembly, which
(Continued)

positions the valve slide in the first or the second basic position when the solenoid coil is not energized. A spring excursion limiting means limits a specified spring excursion of the second spring portion to position the valve slide in an intermediate position between the first and second basic position by the energized solenoid coil. The valve slide releases at least a partial cross section of the passage opening in the intermediate position.

14 Claims, 4 Drawing Sheets

(58) Field of Classification Search
USPC .............. 251/129.08, 129.15, 129.19, 129.2, 251/284–285
See application file for complete search history.

(56) References Cited

U.S. PATENT DOCUMENTS

| | | | | |
|---|---|---|---|---|
| 4,524,947 A | * | 6/1985 | Barnes ................ | F16K 31/0651 251/129.08 |
| 4,546,955 A | * | 10/1985 | Beyer ................ | F16K 31/0679 251/129.15 |
| 4,608,208 A | * | 8/1986 | Yogo ........................ | F02M 5/08 251/337 |
| 4,896,860 A | | 1/1990 | Malone | |
| 5,069,420 A | * | 12/1991 | Stobbs ................ | B60T 8/3665 251/129.08 |
| 6,273,396 B1 | * | 8/2001 | Kato ................... | F16K 31/0655 251/337 |

FOREIGN PATENT DOCUMENTS

| | | |
|---|---|---|
| DE | 10 2006 014 463 A1 | 8/2007 |
| DE | 10 2007 005466 A1 | 8/2007 |
| DE | 20 2011 001 671 U1 | 1/2011 |
| EP | 0 561 404 A1 | 9/1993 |
| EP | 1 657 431 A1 | 9/2005 |
| EP | 1 657 431 A1 | 5/2006 |

OTHER PUBLICATIONS

International search report for related application PCT/EP2014/061481, issued Aug. 21, 2014.

* cited by examiner

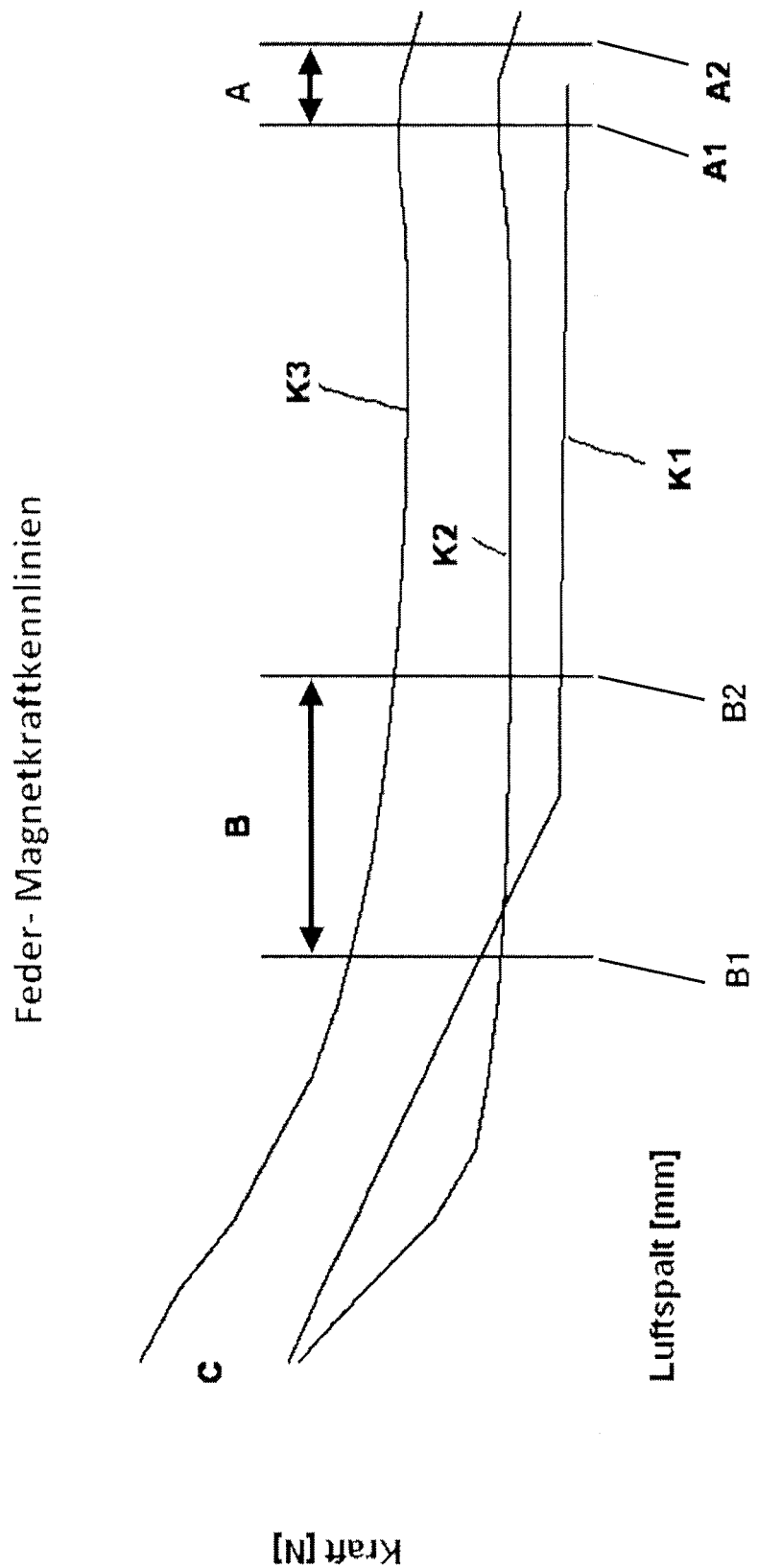

ELECTROMAGNETIC VALVE FOR CONTROLLING THE FLOW OF A PRESSURE MEDIUM

CROSS REFERENCE TO RELATED APPLICATIONS

This patent application claims priority to International Patent Application PCT/EP2014/061481, filed on Jun. 3, 2014, and thereby to German Patent Application 10 2013 211 014.6, filed on Jun. 13, 2013.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to an electromagnetic valve for controlling the flow of a pressure medium.

Background of the Invention

Such Actively adjustable damping systems that are designed for vehicles and that usually operate on the principle of a variable opening cross section are well-known. Such dampers (shock absorbers) adjust the corresponding shock damping characteristics by means of hydraulic proportional valves and can be adapted to a wide range of driving situations, for example, with respect to the surface of the road lane or to various customer specifications. The proportional valves continuously control the fluid flow in the damper by means of a movable slide, which is moved by a solenoid coil. The proportional valve's cross section, through which the oil flows, changes as a function of the energization of the electromagnetic proportional valve.

EP 1 657 431 A1 discloses a generic electromagnetic valve as a slide valve, in which the valve slide, which is disposed in a slide channel of a valve body in such a way that said valve slide can be displaced, consists of a hollow cylindrical slide portion, which takes over the slide function, and an adjoining armature portion, which is in magnetic operative connection with a pole core.

According to this EP 1 657 431 A1, the region of the hollow cylindrical slide portion has radial apertures, which release or close the radial passage openings of the valve body as a function of the position of the valve slide in the slide channel, so that the fluid is allowed to flow through the valve by way of a fluid inlet port on the slide channel into the cavity of the hollow cylindrical slide portion and by way of its apertures in the passage openings, which are designed as the fluid outlet port; or said fluid flow through the valve is blocked. In the de-energized state of the solenoid coil, a compression spring exhibiting a linear characteristic between the pole core and the valve slide pre-stresses the said valve slide into a basic position that closes the passage opening.

In addition to continuously adjustable damping systems, damping systems having a damping characteristics that can be adjusted in discrete stages are also well-known. However, damping systems of this type that comprise the electromagnetic slide valves known from the prior art can only be implemented with inadequate properties. It has been demonstrated that if a helical spring with a linear characteristic is used, then it will not be possible to steer the valve slide into a central position between the basic settings, which release or close the passage openings, and to maintain this central position by energizing the solenoid coil with an average current intensity.

Therefore, the object of the present invention is to provide an electromagnetic valve that is designed to control the flow of a pressure medium and that is suitable for adjusting in discrete stages the damping characteristic of a damping system, especially a shock absorber (damper) of a vehicle.

This engineering object is achieved by means of an electromagnetic valve exhibiting the features disclosed herein.

BRIEF SUMMARY OF THE INVENTION

In a preferred embodiment, an electromagnetic valve (1) for controlling the flow of a pressure medium, said electromagnetic valve comprising a valve housing (2) with an inlet port (2.1) and an outlet port (2.2) for the pressure medium, at least one passage opening (3), which connects the inlet port (2.1) to the outlet port (2.2), for the pressure medium, a valve slide (4) that can be moved axially between a first basic position (I), which closes the passage opening (3), and a second basic position (II), which opens the passage opening (3), by means of a solenoid coil (5), and a spring assembly (6), which positions the valve slide (4) in the first or the second basic position (I, II) when the solenoid coil (5) is not energized, wherein the spring assembly (6) comprises a first spring portion (6.1) and a second spring portion (6.2), which is connected in series to the first spring portion, wherein the second spring portion (6.2) has a smaller spring constant than the first spring portion (6.1), a spring excursion limiting means (7) is provided that limits a specified spring excursion of the second spring portion (6.2), in order to position the valve slide (4) in an intermediate position (III) between the first and second basic position (I, II) by means of the energized solenoid coil (5), and the valve slide (4) is designed to release at least a partial cross section of the passage opening (3) in the intermediate position (III).

The electromagnetic valve as described herein, wherein the valve slide (4) is designed as an armature with a hollow cylindrical slide portion (4.1), wherein the slide portion (4.1) has at least one radial aperture (8) that at least partially overlaps the passage opening (3) in the intermediate position (III) of the valve slide (4).

The electromagnetic valve as described herein, wherein the valve slide (4) has an armature portion (4.2) that is located opposite the hollow cylindrical slide portion (4.1) on the end side.

The electromagnetic valve as described herein, wherein a pole core (9), which enters into magnetic interaction with the valve slide (4), is provided with an armature space (9.1),
the spring assembly (6) is arranged between the pole core (9) and the valve slide (4), and
the valve slide (4) is biased by the spring assembly (6) in the opposite direction of the magnetic interaction force.

The electromagnetic valve as described herein, wherein the armature portion (4.2) has a cylindrical cavity (4.3), which in order to at least partially accommodate the first spring portion (6.1) is adapted to its radial contour, wherein one end of the first spring portion (6.1) is supported by the base surface of the cylindrical cavity (4.3) of the armature portion (4.2).

The electromagnetic valve as described herein, wherein the pole core (9) is designed with a blind borehole (9.2), wherein one end of the second spring portion (6.2) of the spring assembly (6) is supported by the base surface of the blind borehole (9.2).

The electromagnetic valve as described herein, wherein the spring excursion limiting means (7) is designed as a spring washer, at which the first spring portion (6.1) is supported on one side of the spring washer (7), and the second spring portion (6.2) is supported on the other side of the spring washer (7).

The electromagnetic valve as described herein, wherein the spring washer (7) is designed with an excursion limiting flange (7.1), which has an axial length, in such a way that in the intermediate position (III) of valve slide (4) the free end face (7.2) of the excursion limiting flange (7.1) rests against the pole core (9) while limiting the spring excursion of the second spring portion (6.2).

The electromagnetic valve as described herein the first and second spring portion (6.1, 6.2) of the spring assembly (6) are designed as the first and second spring element respectively, preferably in each instance as a compression spring.

The electromagnetic valve as described herein wherein the excursion limiting flange (7.1) of the spring excursion limiting means (7) for guiding the second spring portion (6.2) is adapted to the inner contour thereof.

The electromagnetic valve as described herein, wherein the spring washer (7) for guiding the first spring portion (6.1) has a guide flange (7.3), which is adapted to the inner contour of the first spring portion.

The electromagnetic valve as described herein (1), as claimed in any one of the preceding claims, wherein the valve housing (2) has a valve body (10) with an axial slide channel (10.1) for guiding the valve slide (4), wherein the at least one radial passage opening (3) is arranged on an end-sided end.

The electromagnetic valve as described herein, wherein the valve housing (2) has at least one radial inlet port (2.1) corresponding with the passage opening (3).

The electromagnetic valve as described herein, wherein the valve housing (2) has an axial outlet port (2.2) corresponding with the hollow cylindrical slide portion (4.1).

BRIEF DESCRIPTION OF THE DRAWINGS

FIG. 4 is a graph with the spring/magnetic force characteristic curves for the purpose of explaining the operating principle of the electromagnetic valve according to FIGS. 1 to 3.

DETAILED DESCRIPTION OF THE INVENTION

Figure 1:
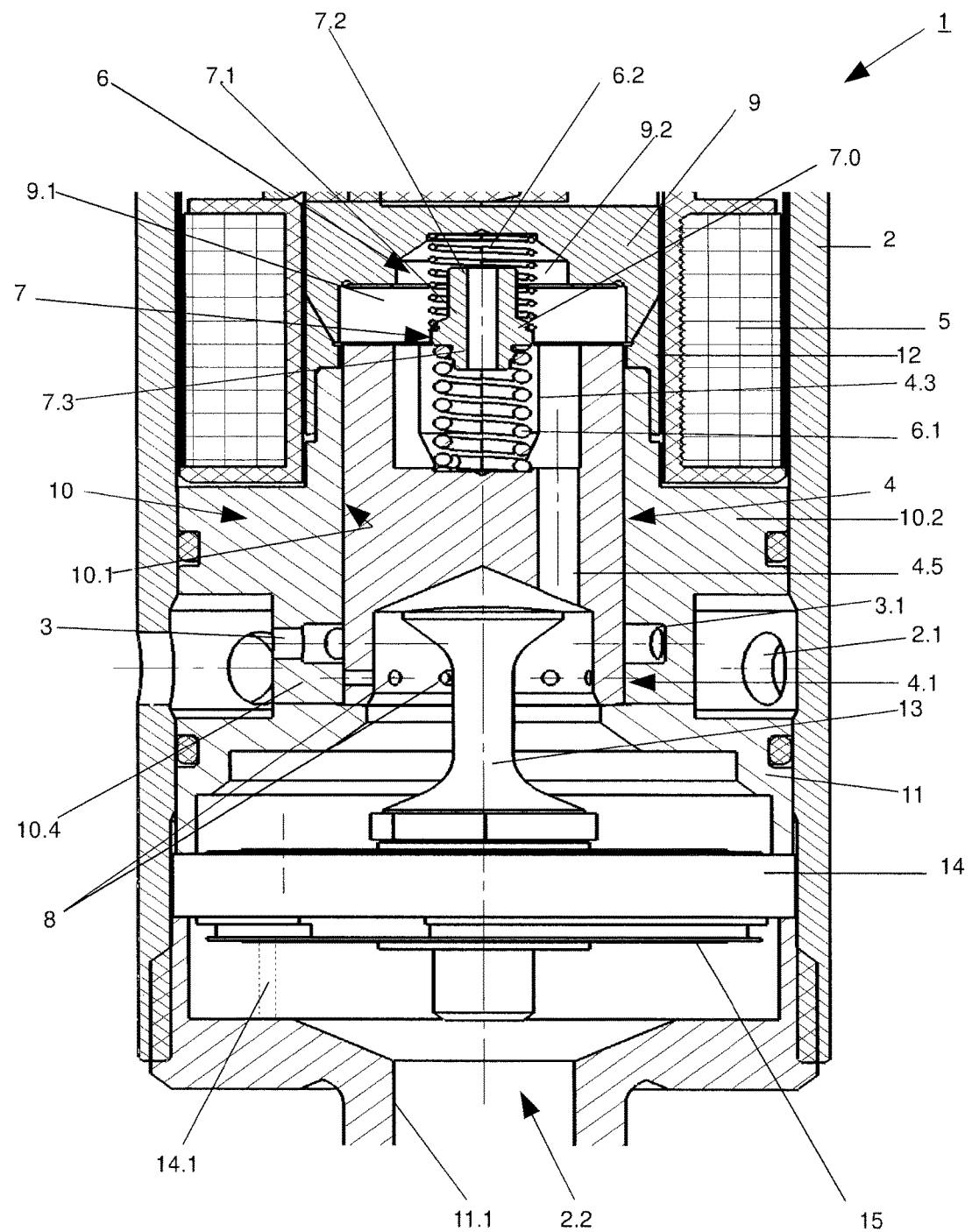
FIG. 1 is a line drawing evidencing in schematic form a sectional view of an electromagnetic valve as an embodiment of the invention with a valve slide in the first basic position.

The invention is an electromagnetic valve for controlling the flow of a pressure medium, said electromagnetic valve comprising
a valve housing with an inlet port and an outlet port for the pressure medium,
at least one passage opening, which connects the inlet port to the outlet port, for the pressure medium,
a valve slide that can be moved axially between a first basic position, which closes the passage opening, and a second basic position, which opens the passage opening, by means of a solenoid coil, and
a spring assembly, which positions the valve slide in the first or the second basic position when the solenoid coil is not energized,
is characterized, according to the invention, in that
the spring assembly comprises a first spring portion and a second spring portion, which is connected in series to said first spring portion, wherein the second spring portion has a smaller spring constant than the first spring portion,
a spring excursion limiting means is provided that limits a specified spring excursion of the second spring portion, in order to position the valve slide in an intermediate position between the first and second basic position by means of the energized solenoid coil, and
the valve slide is designed to release at least a partial cross section of the passage opening in the intermediate position.

The use of a series connection comprising a hard spring (first spring portion) and a soft spring (second spring portion) leads to a spring characteristic of the spring assembly having a flat characteristic curve and a steep characteristic curve. Due to the fact that the second spring portion (soft spring) is limited in its spring excursion by means of the spring excursion limiting means, the result is a kinked spring characteristic curve of the spring assembly, so that at the kink point of the spring characteristic curve, the soft spring is blocked. The associated magnetic force characteristic curve never runs in essence horizontally, so that it is possible to set a stable intersection and, thus, a stable intermediate position of the valve slide with the spring characteristic. Furthermore, owing to the steep rise in the spring characteristic curve caused by the first spring portion (the hard spring), the fluctuations in the amount of the magnetic force have only a slight impact on the intermediate position.

According to one advantageous embodiment of the invention, the valve slide is designed as an armature with a hollow cylindrical slide portion, where in this case the slide portion has at least one radial aperture that at least partially overlaps the passage opening in the intermediate position of the valve slide. By designing the valve slide as an armature with a hollow cylindrical slide portion, the net result is a structurally simple design. In this respect the valve slide has preferably an armature portion that is located opposite the hollow cylindrical slide portion on the end side.

Furthermore, one advantageous embodiment of the invention provides that a pole core, which enters into magnetic interaction with the valve slide, is provided with an armature space, the spring assembly is arranged between the pole core and the valve slide, and the valve slide is biased by the spring assembly in the opposite direction of the magnetic interaction force.

The net result is a space saving arrangement of the spring assembly between the pole core and the valve slide, where in this case the profile of the magnetic field characteristic can also be influenced in terms of a stable intermediate position by means of a suitable design of the geometry of the pole core.

Furthermore, a further development of the invention provides that the armature portion has a cylindrical cavity, which in order to at least partially accommodate the first spring portion, is adapted to the radial contour thereof, where in this case one end of the first spring portion is supported by the base surface of the cylindrical cavity of the armature portion. Due to the partial arrangement of the first spring portion in the area of the valve slide it is possible to achieve a space saving design of the valve.

Preferably the pole core is designed with a blind borehole, where in this case one end of the second spring portion of the spring assembly is supported by the base surface of the blind borehole.

According to a particularly advantageous embodiment of the invention, the spring excursion limiting means is designed as a spring washer, at which the first spring portion is supported on one side of the spring washer, and the second spring portion is supported on the other side of the spring washer.

In this case, such a spring washer is designed, according to a further development of the invention, with an excursion limiting flange, which has an axial length, in such a way that in the intermediate position of valve slide the free end face of the excursion limiting flange rests against the pole core while limiting the spring excursion of the second spring portion. The energization of the solenoid coil with an average current intensity generates a magnetic force that moves the valve slide against the spring force of the spring assembly in the direction of the pole core, where in this case at first only the spring force of the second spring portion (soft spring) initially generates the counterforce, until the spring washer, which moves along together with the contracting second spring portion, is blocked by its excursion limiting flange striking against the pole core; and, as a result, it is no longer possible to shorten the spring excursion any further. Hence, the valve slide has reached its intermediate position.

If at this point the magnetic force on the valve slide is further increased by increasing the intensity of the energization, then the spring force also increases in accordance with the now ensuing steep characteristic curve of the first spring portion, until the valve slide has reached its second basic position by striking against the pole core.

With respect to the spring assembly a further development of the invention provides that the first and second spring portion of the spring assembly are designed as the first and second spring element respectively, preferably in each case as a compression spring or a helical spring. In this way spring assembly can be implemented, on the one hand, as a spring with two spring portions, said spring portions having different winding distances, and, on the other hand, with two separate spring elements, which are connected to each other by means of the spring washer.

It is especially advantageous, if the excursion limiting flange of the spring washer for guiding the second spring portion or more specifically the second spring element is adapted to the inner contour of said second spring element. Correspondingly it is also advantageous if, according to a further development of the invention, the spring washer for guiding the first spring portion or more specifically the first spring element has a guide flange, which is adapted to the inner contour of the first spring element.

On the whole, the net result is a simple structural design for guiding the spring assembly in a reliable way.

Furthermore, according to one embodiment of the invention, the valve housing has a valve body with an axial slide channel for guiding the valve slide, where in this case the at least one radial passage opening is arranged on an end-sided end.

Furthermore, the valve housing has at least one radial inlet port corresponding with the passage opening. The associated axial outlet port is also formed in the valve housing so as to correspond with the hollow cylindrical slide portion.

DETAILED DESCRIPTION OF THE FIGURES

Figure 2:
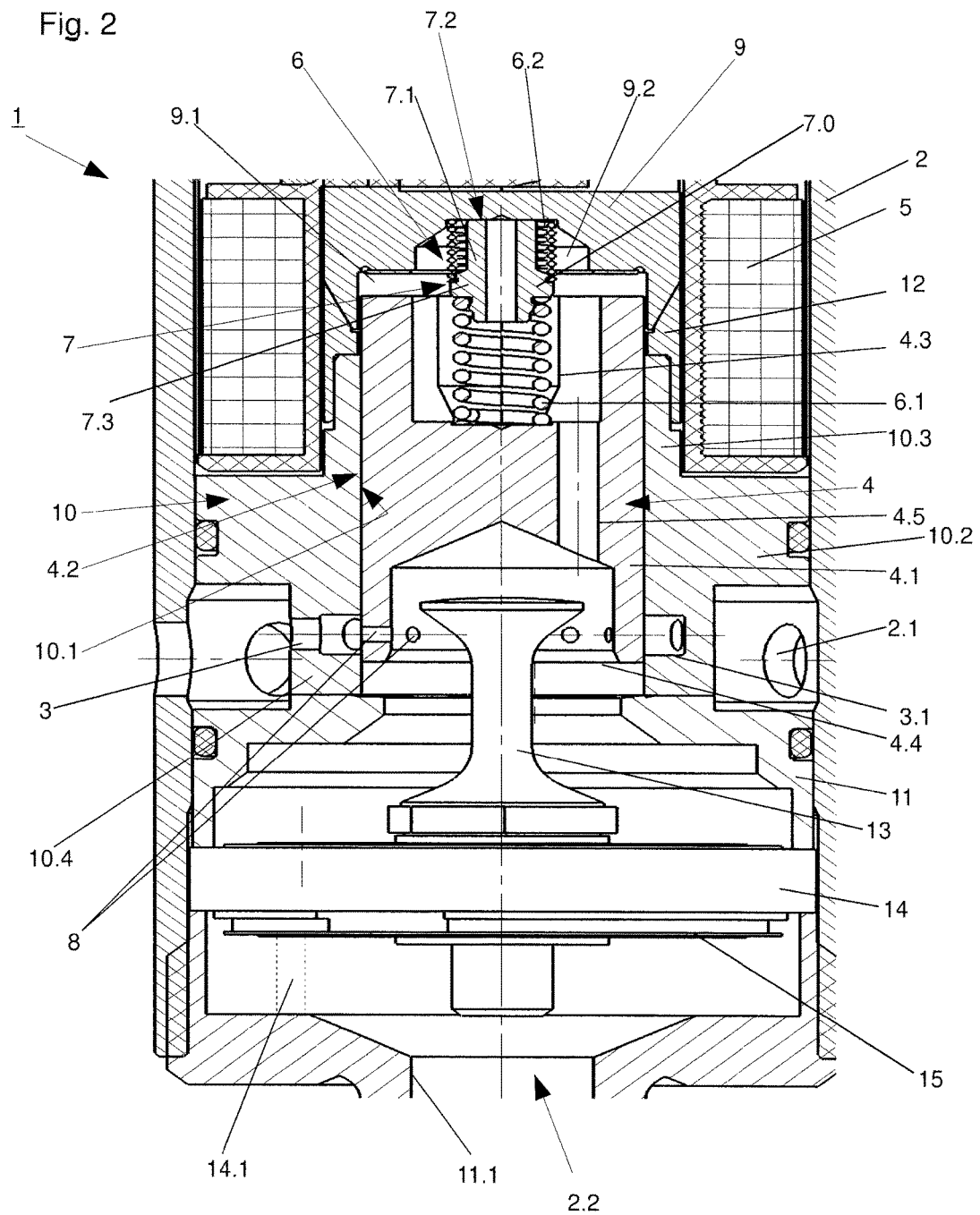
FIG. 2 is a line drawing evidencing in schematic form a sectional view of the electromagnetic valve according to FIG. 1, in which the valve slide is located in an intermediate position.
Figure 3:
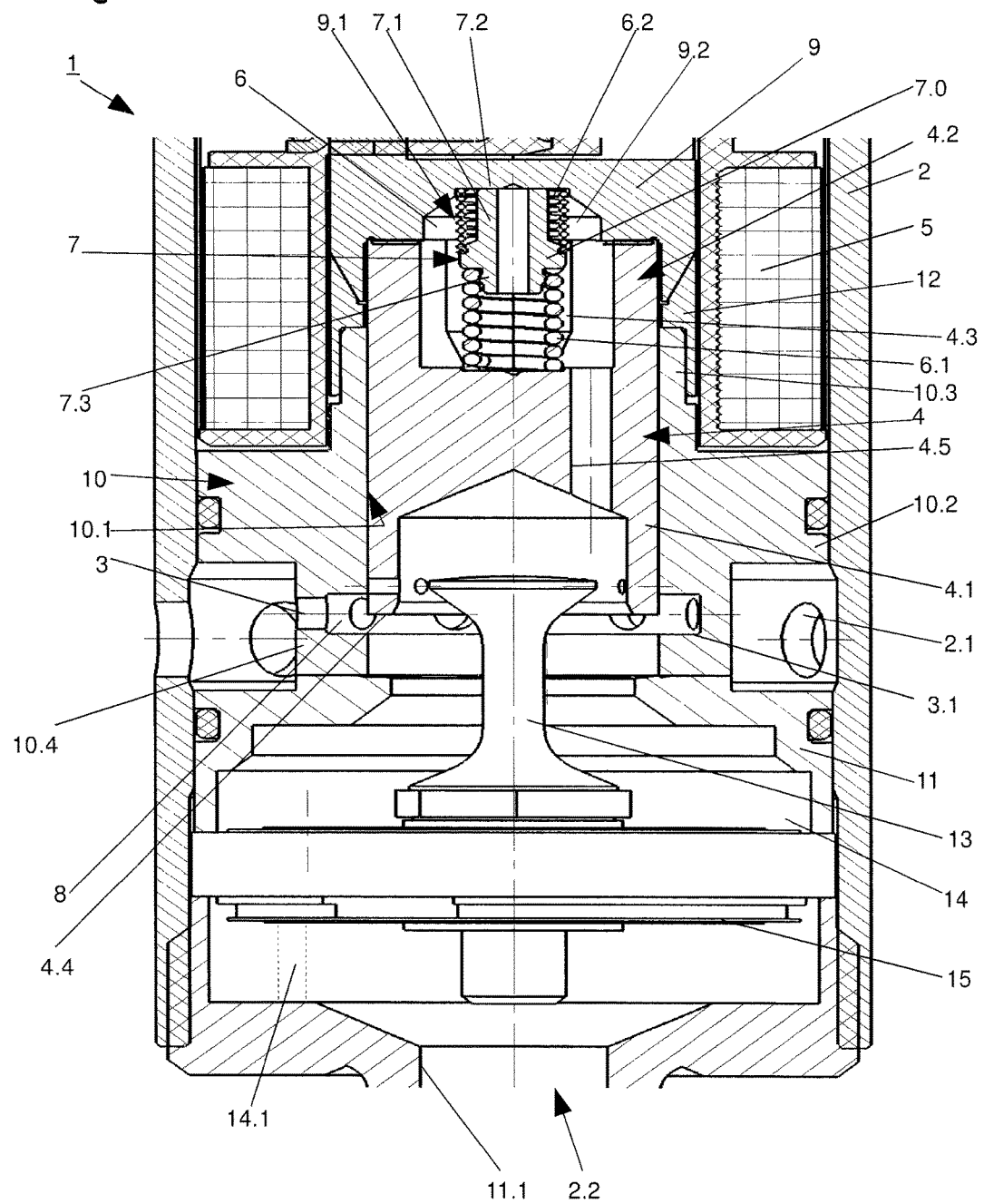
FIG. 3 is a line drawing evidencing in schematic form a sectional view of the electromagnetic valve according to FIG. 1, in which the valve slide is located in a second basic position.

FIGS. 1, 2 and 3 show in each instance the identical electromagnetic valve 1, where in this case the representations differ only in the different positions of a valve slide 4, where in this case the different positions are due to the different states of energization of a solenoid coil 5.

This electromagnetic valve 1 is used to adjust the damping characteristic of a damping system for motor vehicles and is designed in three stages, so that three distinguishable damping characteristics can be set as a function of the position of the valve slide 4. Hence, in addition to a first basic position I (see FIG. 1), in which the passage openings 3, which allow a pressure medium to flow through, are closed when a solenoid coil 5 is not energized, and in addition to a second basic position II (see FIG. 3), in which an unimpeded flow of the pressure medium takes place with maximum energization of the solenoid coil 5, a third position with a partial energization of the solenoid coil 5, a so-called intermediate position III (see FIG. 2) of the valve slide 4, is implemented, in which the flow of the pressure medium is throttled by the passage openings 3.

The electromagnetic valve 1, shown in FIGS. 1, 2 and 3, comprises a cup-shaped valve housing 2, which accommodates a valve body 10, a pole core 9, the solenoid coil 5 and a cup-shaped end part 11. The valve body 10 is formed with a central slide channel 10.1 for the axially displaceable accommodation of the valve slide 4 and produces a connection to the end part 11 on the end face, which faces away from the pole core 9; and said end part in turn has an outlet port 2.2 of the valve 1.

The valve body 10 is composed of a central portion 10.2, a ring-shaped portion 10.3, which is offset relative to the central portion 10.2 and which is connected to the pole core 9 without a break in the surface by means of a connecting ring 12, and an additional ring-shaped portion 10.4, which is opposite the ring-shaped portion 10.3 and is also offset relative to the central portion 10.2, where in this case this additional ring-shaped portion 10.4 has radially extending passage openings 3 distributed on the periphery. These passage openings 3 are connected by means of a radially encircling annular groove 3.1 on the peripheral surface of the slide channel 10.1. Furthermore, the passage openings 3 are connected to corresponding inlet ports 2.1 in the valve housing 2; and these passage openings communicate by means of a radially encircling annular groove, which is formed together with the housing 2 and the end part 11 on the peripheral surface of the ring-shaped portion 10.3.

In order to form an end-sided termination of the slide valve 4, the end part 11 rests against the end face of the ring-shaped portion 10.4 of the valve body 10. This end part has an axial opening 11.1 on the end face, in order to form the outlet port 2.2. The valve slide-sided end face of the end part 11 forms the stop for the valve slide 4 for the purpose of defining its first basic position I when the solenoid coil 5 is not energized.

The central portion 10.2 of the valve body 10 is surrounded in a shape locking manner by the valve housing 2, as a result of which a sealing ring seals the valve space in an annular groove.

The valve body 10, the connecting ring 12 and the armature space 9.1 of the pole core 9, said armature space being formed as a blind borehole, are designed in such a way that the slide channel 10.1 forms with the connecting ring 12 and the armature space 9.1 a uniform cylindrical space, so that the valve slide 4 can be displaced along this cylindrical space, thus from the first basic position I, shown in FIG. 1, as far as into the second basic position II, which is shown in FIG. 3 and in which the valve slide 4 plunges into the armature space 9.1 and strikes against the pole core 9.

The valve slide 4 has a cylindrical shape, which is adapted to the cylindrical slide channel 10.1 and comprises a hollow cylindrical slide portion 4.1 and an adjoining armature portion 4.2. The interior of the hollow cylindrical slide portion 4.1 is designed as a blind borehole, to which the armature portion 4.2 is connected, so that both the hydraulic function of a slide element and the magnetic function of an armature member are integrated into a single component, the valve slide 4.

In the de-energized state of the solenoid coil 5 the valve slide 4, biased by the spring assembly 6, is held by means of this spring assembly 6, which is arranged between the valve slide 4 and the pole core 9, in the first basic position I according to FIG. 1. In this basic position I the valve slide 4 rests against the end part 11, so that the passage openings 3, including the annular groove 3.1 in the ring-shaped portion 10.4 of the valve body 10, are closed by the hollow cylindrical slide portion 4.1 of the valve slide 4.

Furthermore, the slide portion 4.1 of the valve slide 4 has a plurality of radially extending apertures 8, which are arranged on its periphery and which connect the interior of the hollow cylindrical slide portion 4.1 to the exterior of the valve slide 4. These apertures 8 are introduced in the cylinder wall of the hollow cylindrical slide portion 4.1 with only a slight axial offset relative to the free end face of the slide portion 4.1, so that in the first basic position I of the valve slide 4 according to FIG. 1, these apertures 11 cannot overlap the passage openings 3 or more specifically the annular groove 3.1 that connects these passage openings 3.

It is well-known that energizing the solenoid coil 5 with a specified current intensity leads to the generation of a magnetic field, which moves the valve slide 4 against the spring force of the spring assembly 6 in the direction of the pole core 9, until the spring force of the spring assembly 6 is in equilibrium with the magnetic force of the magnetic field.

The spring assembly 6 consist of two spring portions 6.1 and 6.2, which are connected in series by means of a spring washer 7, where in this case said spring washer 7 also acts as a spring excursion limiting means of the second spring portion 6.2. The first spring portion 6.1 is received in essence by a hollow cylinder 4.3 of the armature portion 4.2 and is supported on the base surface of this hollow cylinder 4.3, where in this case the diameter of this hollow cylinder 4.3 for guiding the first spring element 6.1 is adapted to the radial diameter of said first spring element. The free end of the second spring portion 6.2 is braced against a blind borehole 9.2 of the pole core 9.

The first spring portion 6.1 and the second spring portion 6.2 consist in each instance of a helical compression spring as the first and second spring element respectively. The second spring element 6.2 is designed with a smaller spring constant than the first spring element 6.1, so that the first spring element constitutes a hard spring, compared to which the second spring element is a soft spring.

The result of this arrangement is a spring characteristic curve K1, according to FIG. 4, with a spring force curve that is shown as a function of the air gap between the valve slide 4 and the pole core 9, where in this case, starting from the basic position I according to FIG. 1, the change in the width of the air gap corresponds to the valve lift of the valve slide 4. Therefore, in accordance with the basic position I, the spring characteristic curve K1 begins with the largest value of the air gap, where in this case a tolerance field A with a minimum and a maximum tolerance A1 and A2 indicates this basic position I.

According to FIG. 4, this spring characteristic curve K1 represents a kinked characteristic curve, which consists of an essentially horizontal and linear branch, which is generated by the second, i.e., the soft spring element 6.2, and an adjoining steep and also linear branch, where in this case the steep branch is generated by the first, i.e., the stiff spring element 6.1.

The kink point K of this spring characteristic curve K1 occurs due to the fact that on reaching an intermediate position III shown in FIG. 2, the second spring element 6.2 is limited in its spring excursion by means of the spring excursion limiting means 7.

The spring washer 7, as the spring excursion limiting means, comprises the actual spring washer element 7.0, on which the first spring element 6.1 is supported on the armature side and on which the second spring element 6.2 is supported on the pole core side. Furthermore, the spring washer 7 has a guide flange 7.3, which projects into the first spring element, in order to guide said first spring element 6.1. Furthermore, an excursion limiting flange 7.1 is provided; and this excursion limiting flange projects into the second spring element 6.2 and is used at the same time to both guide said second spring element and also to limit the spring excursion of the same.

The spring excursion limiting action occurs due to the fact that when a magnetic field of the energized solenoid coil 5 causes the valve slide 4 to move in the direction of the pole core 9 owing to the smaller spring constant of the second spring element 6.2, initially this second spring element generates the spring force against the movement of the valve slide 4 and is compressed without causing the first spring element 6.1 to change thereby substantially its length. As a result, with the movement of the valve slide 4 the spring excursion limiting means 7 also moves in the direction of the pole core 9, until a free end face 7.2 of the excursion limiting flange 7.1 rests against the base surface of the blind borehole 9.2 of the pole core 9, as result of which the kink point K is defined. If the valve slide 4 were to continue to move in the direction of the pole core 9, the first spring element 6.1 would now generate an additional spring force, so that if the valve slide 4 were to continue to move in the direction of the pole core 9, the spring force would increase in conformity with the steep branch of the spring characteristic curve K1 according to FIG. 4.

In order to steer the valve slide 4 into the intermediate position III according to FIG. 2, the solenoid coil 5 is partially energized with a current of a first current intensity, so that the magnetic force characteristic curve K2, shown in the graph according to FIG. 4, is produced. This magnetic force characteristic curve intersects the steep branch of the spring force characteristic curve K1 in the tolerance field B, which is defined by a minimum tolerance B1 and a maximum tolerance B2. At this point of intersection of the two characteristic curves K1 and K2 the spring force and the magnetic force compensate for each other, so that the valve slide 4 occupies a stable position in this situation.

In this position of the valve slide 4 according to FIG. 2, the apertures 8 and the passage openings 3 or more specifically the annular groove 3.1 overlap, so that the result is a throttled cross section, which is defined by the cross section of the apertures 3 and through which the pressure medium is conveyed.

If, in contrast, the solenoid coil 5 is maximally energized with a higher current having a second current intensity, then a magnetic force characteristic curve K3 is generated according to FIG. 4. This magnetic force characteristic curve does not form a point of intersection with the spring force characteristic curve K1. The result of this arrangement is that the valve slide 4 is attracted by the pole core 9 beyond the intermediate position III, until the pole core-sided end face of the armature portion 4.2 rests against the pole core 9. Hence, the valve slide 4 has reached a second basic position II, and this area is marked with the letter C on the graph according to FIG. 4.

In this second basic position II the apertures 8 are no longer connected to the passage openings 3 and the annular groove 3.1, which connects said passage openings to each other, but rather are covered by the inner shell of the ring-shaped portion 10.4. However, the aperture 8 does not have to be closed. For the flow forces it is even advantageous if the aperture 8 in the second basic position (energized) is still partially open. However, a control edge 4.4 of the slide portion 4.1, said control edge being formed by the end face of this slide portion 4.1, releases the passage openings 3 and the annular ring 3.1, which connects these passage openings 3, so that the full cross section of the passage openings 3 becomes effective.

This arrangement allows the pressure medium to flow out through the inlet ports 2.1 and the apertures 8 into the slide channel 10.1, and from there through the end part 11 into the outlet port 2.2.

In the end, part 11 a shell-shaped flow guide part 13 is arranged centrally on a valve plate 14; and this flow guide part is supposed to direct the flow of the pressure medium in the direction of the outlet port 2.2. The valve plate 14 has on the outlet side a leaf spring 15, which is pressurized by the pressure medium by way of the pressure ports 14.1, so that this leaf spring 10 lifts off; and the pressure medium can flow out through the outlet port 2.2.

A plurality of pressure equalizing channels 4.5 are provided in the armature portion 4.2 of the valve slide 4; and these pressure equalizing channels connect the cavity of the slide portion 4.1 to the pole-sided end face of the armature portion 4.2. This arrangement provides an equalization of the pressure between the cavity of the slide portion 4.1 and the armature space 9.1.

LIST OF REFERENCE NUMBERS 1 electromagnetic valve
2 valve housing
2.1 inlet port of the valve housing 2
2.2 outlet port of the valve housing 2
3 passage opening
3.1 annular groove
4 valve slide
4.1 slide portion of the valve slide 4
4.2 armature portion of the valve slide 4
4.3 hollow cylinder of the armature portion 4.2
4.4 control edge of the slide portion 4.1
4.5 pressure equalizing channel of the armature portion 4.2
5 solenoid coil
6 spring assembly
6.1 first spring portion, first spring element
6.2 second spring portion, second spring element
7 spring excursion limiting means, spring washer
7.0 spring washer element of the spring washer 7
7.1 excursion limiting flange of the spring washer 7
7.2 free end face of the excursion limiting flange 7.1
7.3 guide flange of the spring washer 7
8 aperture of the slide portion 4.1
9 pole core
9.1 armature space
9.2 blind borehole
10 valve body
10.1 slide channel of the valve body 10
10.2 central portion of the valve body 10
10.3 ring-shaped portion of the valve body 10
10.4 ring-shaped portion of the valve body 10
11 end part
11.1 end-sided opening of the end part 11
12 connecting ring
13 flow guide part
14 valve plate
14.1 pressure ports
15 leaf spring The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:
1. An electromagnetic valve for controlling the flow of a pressure medium, said electromagnetic valve comprising
 a valve housing with an inlet port and an outlet port for the pressure medium,
 at least one passage opening, which connects the inlet port to the outlet port, for the pressure medium,
 a valve slide that can be moved axially between a first basic position (I), which closes the passage opening, and a second basic position, which opens the passage opening, by means of a solenoid coil, and
 a spring assembly, which positions the valve slide in the first or the second basic position when the solenoid coil is not energized, wherein
 the spring assembly comprises a first spring portion and a second spring portion, which is connected in series to the first spring portion, wherein the second spring portion has a smaller spring constant than the first spring portion, a spring excursion limiting means is provided that limits a specified spring excursion of the second spring portion, in order to position the valve slide in an intermediate position between the first and second basic position by means of the energized solenoid coil, and the valve slide is designed to release at least a partial cross section of the passage opening in the intermediate position at the moment of contact of the spring excursion limiting means.

2. The electromagnetic valve of claim 1, wherein the valve slide is designed as an armature with a hollow cylindrical slide portion, wherein the slide portion has at least one radial aperture that at least partially overlaps the passage opening in the intermediate position of the valve slide.

3. The electromagnetic valve of claim 2, wherein the valve slide has an armature portion that is located opposite the hollow cylindrical slide portion on the end side.

4. The electromagnetic valve of claim 1, wherein a pole core, which enters into magnetic interaction with the valve slide, is provided with an armature space, the spring assembly is arranged between the pole core and the valve slide, and the valve slide is biased by the spring assembly in the opposite direction of the magnetic interaction force.

5. The electromagnetic valve of claim 4, wherein the armature portion has a cylindrical cavity, which in order to at least partially accommodate the first spring portion is adapted to its radial contour, wherein one end of the first spring portion is supported by the base surface of the cylindrical cavity of the armature portion.

6. The electromagnetic valve of claim 1, wherein the pole core is designed with a blind borehole, wherein one end of the second spring portion of the spring assembly is supported by the base surface of the blind borehole.

7. The electromagnetic valve of claim 1, wherein the spring excursion limiting means is designed as a spring washer, at which the first spring portion is supported on one side of the spring washer, and the second spring portion is supported on the other side of the spring washer.

8. The electromagnetic valve of claim 7, wherein the spring washer is designed with an excursion limiting flange, which has an axial length, in such a way that in the intermediate position of valve slide (4) the free end face of the excursion limiting flange rests against the pole core (9) while limiting the spring excursion of the second spring portion.

9. The electromagnetic valve of claim 1, wherein each of the first and second spring portion of the spring assembly is a compression spring.

10. The electromagnetic valve of claim 8, wherein the excursion limiting flange of the spring excursion limiting means for guiding the second spring portion is adapted to the inner contour thereof.

11. The electromagnetic valve of claim 7, wherein the spring washer for guiding the first spring portion has a guide flange, which is adapted to the inner contour of the first spring portion.

12. The electromagnetic valve of claim 1, wherein the valve housing has a valve body with an axial slide channel for guiding the valve slide, wherein the at least one radial passage opening is arranged on an end-sided end.

13. The electromagnetic valve of claim 1, wherein the valve housing has at least one radial inlet port corresponding with the passage opening.

14. The electromagnetic valve of claim 2, wherein the valve housing has an axial outlet port corresponding with the hollow cylindrical slide portion.

* * * * *